US008005473B2

(12) United States Patent
Zeinstra et al.

(10) Patent No.: US 8,005,473 B2
(45) Date of Patent: Aug. 23, 2011

(54) SYSTEM AND METHOD FOR CONFIGURING A WIRELESS COMMUNICATION SYSTEM IN A VEHICLE

(75) Inventors: Mark L. Zeinstra, Holland, MI (US); Michael A. Supanich, Holland, MI (US); Walter M. Eadelman, Belmont, MI (US)

(73) Assignee: Johnson Controls Technology Company, Holland, MI (US)

( * ) Notice: Subject to any disclaimer, the term of this patent is extended or adjusted under 35 U.S.C. 154(b) by 701 days.

(21) Appl. No.: 10/548,911

(22) PCT Filed: Mar. 24, 2004

(86) PCT No.: PCT/US2004/008978
§ 371 (c)(1),
(2), (4) Date: Sep. 13, 2005

(87) PCT Pub. No.: WO2004/086735
PCT Pub. Date: Oct. 7, 2004

(65) Prior Publication Data
US 2006/0168627 A1      Jul. 27, 2006

Related U.S. Application Data

(60) Provisional application No. 60/457,080, filed on Mar. 24, 2003.

(51) Int. Cl.
*H04W 24/00* (2009.01)

(52) U.S. Cl. ............... 455/425; 455/418; 455/575.9; 455/550.1; 455/414.3; 381/302; 381/311; 340/425.5; 340/426.16

(58) Field of Classification Search ............ 455/569, 455/41.2, 456.4, 431, 575.9, 575, 456, 418–420, 455/345.1–345.3; 381/302–311; 340/425–426
See application file for complete search history.

(56) References Cited

U.S. PATENT DOCUMENTS
5,278,759 A    1/1994  Berra et al.
(Continued)

FOREIGN PATENT DOCUMENTS
FR       2819358 A1    7/2002
(Continued)

OTHER PUBLICATIONS

International Search Report and Written Opinion for Application No. PCT/US2004/008978, mailed Jul. 26, 2004, 10 pages.

*Primary Examiner* — Kamran Afshar
*Assistant Examiner* — Kathy Wang-Hurst
(74) *Attorney, Agent, or Firm* — Foley & Lardner LLP

(57) ABSTRACT

A control module for a wireless communication system in a vehicle having a plurality of operational settings includes a memory, a control circuit and a radio frequency transceiver. The memory is configured to store a plurality of performance characteristics associated with at least one mobile wireless communication device. The control circuit is coupled to the memory and is configured to retrieve at least one performance characteristic for a mobile wireless communication device associated with a vehicle occupant and used in conjunction with the wireless communication system. The control circuit is further configured to adjust at least one operational setting of the wireless communication system based on the at least one performance characteristics of the mobile wireless communication device. The radio frequency transceiver is coupled to the control circuit and is configured to communicate with the mobile wireless communication device.

22 Claims, 5 Drawing Sheets

U.S. PATENT DOCUMENTS

| | | | |
|---|---|---|---|
| 5,535,274 A * | 7/1996 | Braitberg et al. | 379/446 |
| 5,555,498 A | 9/1996 | Berra et al. | |
| 5,557,656 A * | 9/1996 | Ray et al. | 455/431 |
| 5,717,387 A | 2/1998 | Suman et al. | |
| 6,532,374 B1 | 3/2003 | Chennakeshu et al. | |
| 6,542,758 B1 * | 4/2003 | Chennakeshu et al. | 455/569.2 |
| 6,915,126 B2 * | 7/2005 | Mazzara, Jr. | 455/411 |
| 6,954,657 B2 * | 10/2005 | Bork et al. | 455/567 |
| 6,990,338 B2 * | 1/2006 | Miller et al. | 455/431 |
| 7,003,316 B1 * | 2/2006 | Elias et al. | 455/556.1 |
| 7,027,781 B2 * | 4/2006 | Ko | 455/92 |
| 7,257,426 B1 | 8/2007 | Witkowski et al. | |
| 7,346,374 B2 | 3/2008 | Witkowski et al. | |
| 7,349,722 B2 | 3/2008 | Witkowski et al. | |
| 7,516,072 B2 | 4/2009 | Campbell et al. | |
| 7,636,658 B2 | 12/2009 | Campbell et al. | |
| 2002/0032048 A1 | 3/2002 | Kitao et al. | |
| 2002/0197955 A1 | 12/2002 | Witkowski et al. | |
| 2003/0060211 A1 * | 3/2003 | Chern et al. | 455/456 |
| 2003/0228879 A1 | 12/2003 | Witkowski et al. | |
| 2004/0048622 A1 | 3/2004 | Witkowski et al. | |
| 2004/0110472 A1 | 6/2004 | Witkowski et al. | |
| 2004/0203379 A1 | 10/2004 | Witkowski et al. | |
| 2005/0090279 A9 | 4/2005 | Witkowski et al. | |
| 2006/0052140 A1 * | 3/2006 | Hicks, III | 455/569.1 |

FOREIGN PATENT DOCUMENTS

| | | |
|---|---|---|
| JP | 2000-0922245 | 3/2000 |
| JP | 2002-193046 | 7/2002 |
| JP | 2002-368873 | 12/2002 |
| JP | 2003-505981 | 2/2003 |
| WO | WO 0108387 A1 | 2/2001 |

* cited by examiner

| | Phone/Carrier/Service | | | Command Set Support | | | | | |
|---|---|---|---|---|---|---|---|---|---|
| Identification | Noise Cancellation | Echo Cancellation | Audio Attenuation | Headset Revision | HandsFree Revision | Dial-up Network Revision | SyncML Support | GSM AT Command Set | Region? |
| Mfg./Model A | +1 dB | 0 | -2 dB | 1.0 | 1.0 | 1.0 | Yes | Yes | na |
| Mfg./Model B | 0 | -1 dB | 0 | No | 2.0 | 1.0 | Yes | Yes | na |
| Carrier A | +1 dB | 0 | 0 | na | na | Yes | na | na | United States |
| Carrier B | 0 | -1 dB | -2 dB | na | na | No | na | na | North America |
| Service A | 0 | 0 | -2 dB | na | na | Yes | na | na | United States |
| Service B | +1 dB | 0 | 0 | na | na | Yes | na | na | Europe |
| Service C | 0 | 0 | 0 | na | na | No | na | na | Japan |

FIG. 4

SYSTEM AND METHOD FOR CONFIGURING A WIRELESS COMMUNICATION SYSTEM IN A VEHICLE

CROSS-REFERENCE TO RELATED APPLICATIONS

This application claims the benefit of U.S. Provisional Application No. 60/457,080, filed Mar. 24, 2003.

FIELD OF THE INVENTION

The present invention relates to wireless communication systems and, in particular, to a system and method for hands free use of a wireless communication device and for configuring a wireless communication system in a vehicle.

BACKGROUND OF THE INVENTION

Personal mobile communication devices, such as cellular phones, have become very popular. Such devices are commonly used while a user is traveling in a vehicle, such as an automobile, as either a driver or passenger. Use of a cellular phone by the driver of a vehicle, however, can be inconvenient and inefficient. In order to operate the phone, the driver typically has to dial and/or hold the phone with one hand. Cellular phones can be small and awkward and uncomfortable to hold while in use. Several solutions have been developed to make use of a cellular phone more convenient for a driver or passenger of a vehicle. Headphones may be used in conjunction with a cellular phone so that the phone does not need to be held to the driver's ear. Alternatively, a phone or equivalent communication device may be integrated into the interior and electrical system of the vehicle. Typically, however, a driver will also have a personal portable cellular phone and may have to establish multiple wireless service contracts for the portable phone and the phone integrated into the car.

Different vehicle occupants may have portable cellular phones that are different makes/models and may be associated with different wireless service providers. Different makes/models of cellular phones of different manufacturers as well as different wireless service providers may have different settings for various system characteristics (e.g., noise attenuation, echo attenuation, etc.) for optimal performance. In addition, mobile phone and cellular service technologies are continually and rapidly being developed. Thus, there is a need for a vehicle wireless communication system that may be configured to operate based on the appropriate settings for a user's specific type of cellular phone, service provider, carrier, etc. to improve performance.

SUMMARY OF THE INVENTION

In accordance with an embodiment, a control module for a wireless communication system in a vehicle having a plurality of operational settings, includes a memory configured to store a plurality of performance characteristics associated with at least one mobile wireless communication device; a control circuit coupled to the memory, the control circuit configured to retrieve at least one performance characteristics for a mobile wireless communication device associated with a vehicle occupant and used in conjunction with the wireless communication system and configured to adjust at least one operational settings of the wireless communication system based on the at least one performance characteristics of the mobile wireless communication device, and a radio frequency transceiver coupled to the control circuit, the radio frequency transceiver configured to communicate with the mobile wireless communication device.

In accordance with another embodiment, a system for configuring a wireless communication system in a vehicle having a plurality of operational settings includes a remote server configured to store a plurality of performance characteristics associated with at least one mobile wireless communication device, a mobile wireless communication device associated with a vehicle occupant and configured to communicate with the remote server and the wireless communication system, and a control module in data communication with the remote server via the mobile wireless communication device, the control module configured to retrieve a plurality of performance characteristics for the mobile wireless communication device from the remote server and to adjust the plurality of operational settings of the wireless communication system based on the plurality of performance characteristics of the mobile wireless communication device.

In accordance with a further embodiment, a method for configuring a wireless communication system in a vehicle for operation with a mobile wireless communication device having a plurality of performance characteristics, the wireless communication system including a control module and having a plurality of operational settings, includes establishing a wireless communication link between the control module and the mobile wireless communication device, receiving an identifier for the wireless mobile communication device via the wireless communications link, retrieving the plurality of performance characteristics for the mobile wireless communication device from the control module, and configuring the plurality of operational settings of the wireless communications system based on the plurality of performance characteristics of the mobile wireless communication device retrieved from the control module.

In accordance with another embodiment, a method for configuring a wireless communication system in a vehicle for operation with a mobile wireless communication device having a plurality of performance characteristics, the wireless communication system including a control module and having a plurality of operational settings, includes establishing a wireless communications link between the control module and the mobile wireless communication device, receiving an identifier from the mobile wireless communication device via the wireless communications link, generating a request to retrieve the plurality of performance characteristics for the mobile wireless communication device, sending the request to a remote server via the wireless communication link and the mobile wireless communication device, receiving the plurality of performance characteristics from the remote server via the mobile wireless communication device, and configuring the plurality of operational settings of the wireless communication system based on the plurality of performance characteristics of the mobile wireless communication device.

BRIEF DESCRIPTION OF THE DRAWINGS

The invention will be more readily understood by reference to the following description taken with the accompanying drawings, in which:

FIG. 4 illustrates an exemplary table of settings for performance characteristics associated with various devices, services and/or carriers in accordance with an embodiment.

DETAILED DESCRIPTION OF THE PREFERRED AND OTHER EXEMPLARY EMBODIMENTS

Figure 1:
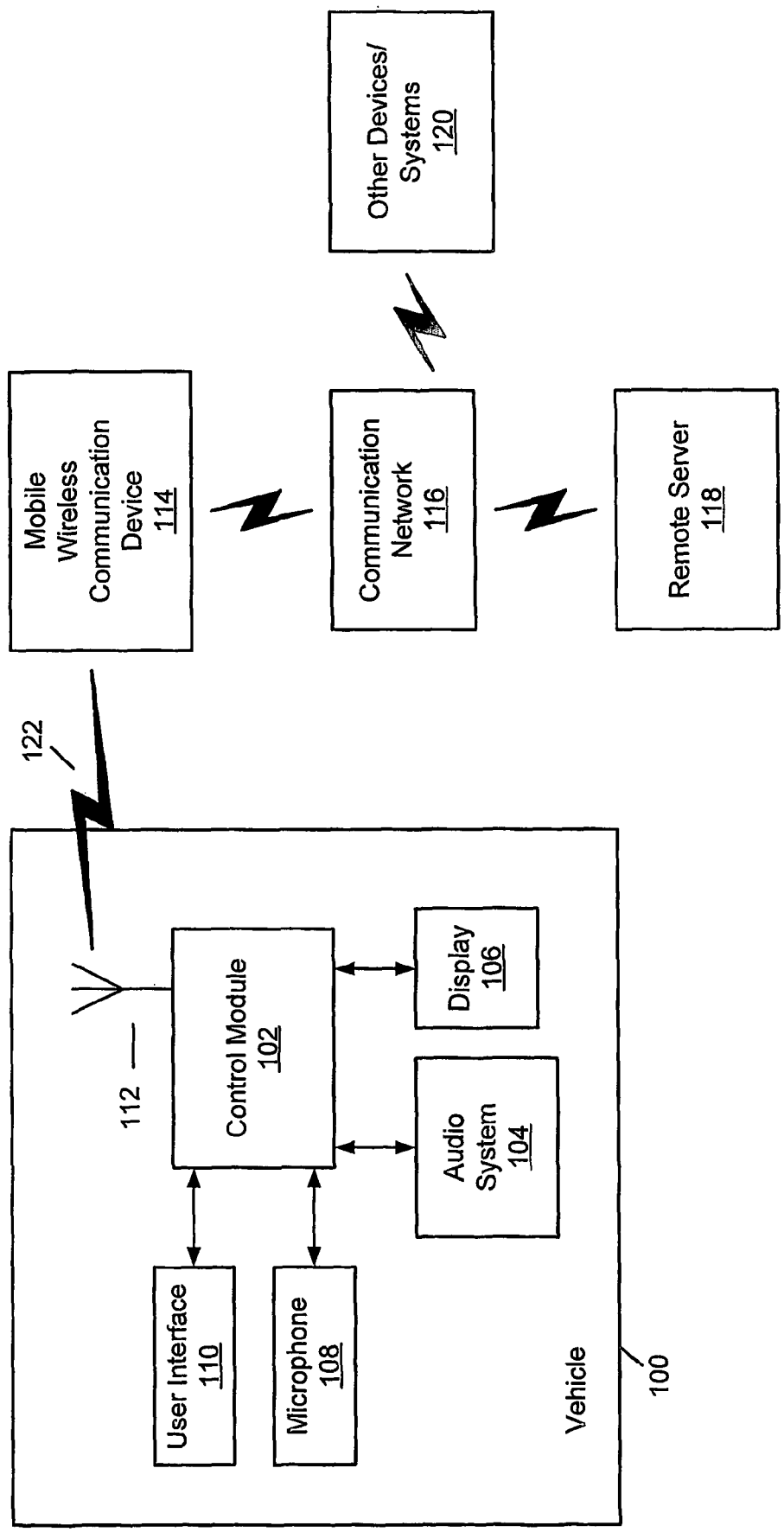
FIG. 1 is a schematic block diagram of a system for hands free operation of a wireless communication device in a vehicle in accordance with an embodiment.

FIG. 1 is a schematic block diagram of a system for hands free operation of a wireless communication device in a vehicle in accordance with an embodiment. The system enables a vehicle occupant, such as a driver, to make a "hands free" call using his/her personal portable or mobile wireless communications device 114, such as a portable or mobile wireless phone, to another device or system 120 via a communication network 116 without requiring the driver to take his/her eyes off of the road and/or his/her hands off of the steering wheel while the vehicle is in motion. Other vehicle occupants (e.g., passengers) may also use the system to make "hands free" calls.

The system shown in FIG. 1 enables a wireless communication link 122 to be established between an audio system 104 of vehicle 100 and a portable or mobile wireless communications device 114 of a vehicle occupant such as a wireless (e.g., cellular) mobile phone. A system and method for establishing a wireless communication link between a vehicle system, such as an audio system, and an electronic device is described in pending U.S. patent application Ser. No. 09/979,199, filed Nov. 20, 2001, entitled "Wireless Communication System and Method," herein incorporated by reference in its entirety. The following description will refer to a wireless phone, however, it should be understood that systems and methods described herein may also be used in conjunction with other wireless communication devices such as a PDA personal digital assistant), portable computer, pager, etc. Vehicle 100 may be, for example, an automobile, truck, sport utility vehicle (SUV), mini-van or other vehicle.

Returning to FIG. 1, vehicle 100 also includes a control module 102 coupled to the audio system 104 and an antenna 112. Antenna 112 enables two-way communication with the mobile wireless communication device 114, e.g., a wireless mobile phone. Control module 102 may include various types of control circuitry, digital and/or analog, and may include a microprocessor, microcontroller, application-specific integrated circuit (ASIC), programmable logic, and/or other circuitry configured to perform various input/output, control, analysis, and other functions described herein. Control module 102 is also coupled to a user interface 110 and a microphone 108. User interface 110 may be used to receive input commands from a vehicle occupant and may be, for example, a set of push buttons. Microphone 108 is configured to receive audio signals (e.g., voice data) from a vehicle occupant and provide the audio signals to control module 102. For example, a vehicle occupant may speak directly into the microphone 108 to provide commands to the control module 102. Voice recognition technologies known in the art may be implemented in control module 102 to process certain audio signals received by the microphone 108. For example, voice recognition technologies may be used to allow for hands free dialing of phone numbers by receiving a voice command from a vehicle occupant and sending a dial command and phone number to wireless mobile phone 114.

Control module 102 may also be coupled to a display 106 that may, for example, comprise a small cathode ray tube (CRT), a liquid crystal display (LCD), a vacuum fluorescent display (VFD) or various other forms of displays which are easily visible in daytime as well as nighttime driving conditions. Each element in vehicle 100 shown in FIG. 1, may be mounted in the same or different interior vehicle elements such as a dashboard, an overhead console, a visor, a rearview mirror or other appropriate location in the vehicle. Preferably, user interface 110, microphone 108 and display 106 are mounted in a location convenient to vehicle occupants, in particular, the driver.

Audio system 104 typically includes at least one speaker (not shown) configured to provide audio signals to a vehicle occupant(s). In one embodiment, audio system 104 is a speech/recording playback system as described in U.S. Pat. No. 5,810,420, herein incorporated by reference. Alternatively, audio system 104 can comprise one or more components of a radio, CD player, or other vehicle entertainment system.

As mentioned above, control module 102 is linked via a wireless communication link 122 with a mobile wireless communication device 114 such as a wireless mobile phone. Wireless communications link 122 operates in accordance with a wireless communications standard. The wireless communications standard is preferably the Bluetooth™ communication standard but may be any other suitable wireless communication standard that enables the transmission of voice and/or data information. Accordingly, mobile wireless communication device 114 is preferably a Bluetooth™ enabled device.

The Bluetooth™ communication standard was established for creating small form factor, low cost, short range RF links between mobile telephones, network computers, PDA's and other portable electronic devices. It is the result of a joint effort between several major commercial organizations to develop an RF communications standard for creating secure, wireless communications links between portable electronic devices. The Bluetooth standard provides the potential for automatic and rapid "ad hoc" wireless connections when two or more devices equipped with RF transceivers operating in accordance with the Bluetooth standard come into proximity with each other. While the Bluetooth standard may be referred to throughout the discussion of various preferred embodiments, it should be understood such embodiments are not limited to the use of any specific communication standard.

Communication link 122 between control module 102 and wireless mobile phone 114 enables "hands free" use of a vehicle occupant's personal wireless mobile phone 114 including both outgoing and incoming calls. For example, a user may dial a number on the wireless mobile phone 114 to place a call and the conversation thereafter can be conducted via the microphone 108 and audio system 104. Alternatively, a call could be placed via commands and numbers spoken into microphone 108 and transmitted via wireless communications link 122 to the wireless mobile phone 114. Calls and information may also be received by control module 102 from wireless mobile phone 114 via wireless communication link 122. Audio information received may be provided to the user via audio system 104 to allow the vehicle occupant to hear received voice data without holding wireless mobile phone 114 to their ear or without the need for an ear phone or head phones, though, in an alternative embodiment, audio system 104 can comprise an ear phone or headphones. Data received from wireless mobile phone 114 may be displayed on display 106.

For an outgoing call, audio signals received via microphone 108 are processed by control module 102 and sent to wireless mobile phone 114 via communication link 122 in the proper data format, for example, in accordance with a wireless communication standard. Wireless mobile phone 114 converts the signals received from control module 102 to the appropriate wireless technology (or network connectivity protocol) of a wireless service provider associated with the vehicle occupant's wireless mobile phone 114 (e.g., analog, digital, 802.11, CDMA (code Division Multiple Access), TDMA (Time Division Multiple Access), GSM (Global System for Mobile communication), etc.). The converted signal is then sent by wireless mobile phone 114 to a communication network 116 (e.g., cellular tower(s)) for transmission to a desired end device or system 120 (e.g., another wireless mobile phone, a land line, a server, etc.). For example, a cellular tower may receive a signal from wireless mobile phone 114, convert the signal to a "land line" signal and send the signal through a switch to the phone being called. Typically, at various stages in the communication process the signal is processed to, for example, reduce noise, echo, etc. For example, control module 102 may process the audio signals received from microphone 108 to reduce the noise from vehicle 100.

Various elements of the system shown in FIG. 1, such as control module 102, wireless mobile phone 114 and its associated wireless service provider/carrier, communication network 116, a telematics service provider (TSP) associated with the wireless communication system (e.g., a company that provides communication, information and entertainment services using computers in concert with telecommunications systems to transport data to and/or from a vehicle), the wireline carrier services involved with the connection, end device/system 120, or other "far-end" terminal devices/equipment involved with the connection, have corresponding operational settings or performance characteristics such as audio levels, echo cancellation, noise cancellation, versions of software used in the operation of the device/system (e.g., software for the communication standard, synchronization, etc.), regional specific technologies, regional specific languages, etc. These performance characteristics typically vary for different makes/models of devices, manufacturers, service providers, carriers, technologies and so on. Other elements or performance characteristics that may differ are off-board recognition systems of the wireless (e.g., cellular) network, off-board recognition systems of the TSP, vo-coders used in phones of the wireless network, line echo of the TSP, types of off-board data services of the TSP, modems of the TSP, services such as toll road and payments of the TSP and technologies used in different geographic regions. The performance of the wireless communication system in vehicle 100, therefore, may be affected when control module 102 is used in conjunction with different types of wireless phones 114, wireless service providers, carriers, TSP's, communication networks 116, end devices/systems 120, etc. Accordingly, control module 102 is configured to enable configuration and adjustment of the settings of a plurality of performance characteristics to adapt to and/or compensate for the settings of performance characteristics for the particular type of wireless mobile phone, service provider, communication network, etc. used in conjunction with control module 102. A remote server 118 is provided that includes information regarding the settings of a plurality of performance characteristics for a plurality of types of phones, services, carriers, etc. that may be used in conjunction with control module 102. Remote server 118 may be accessed by control module 102 via wireless mobile phone 114 and communication network 116 to retrieve the appropriate settings, as discussed in more detail below.

Figure 2:
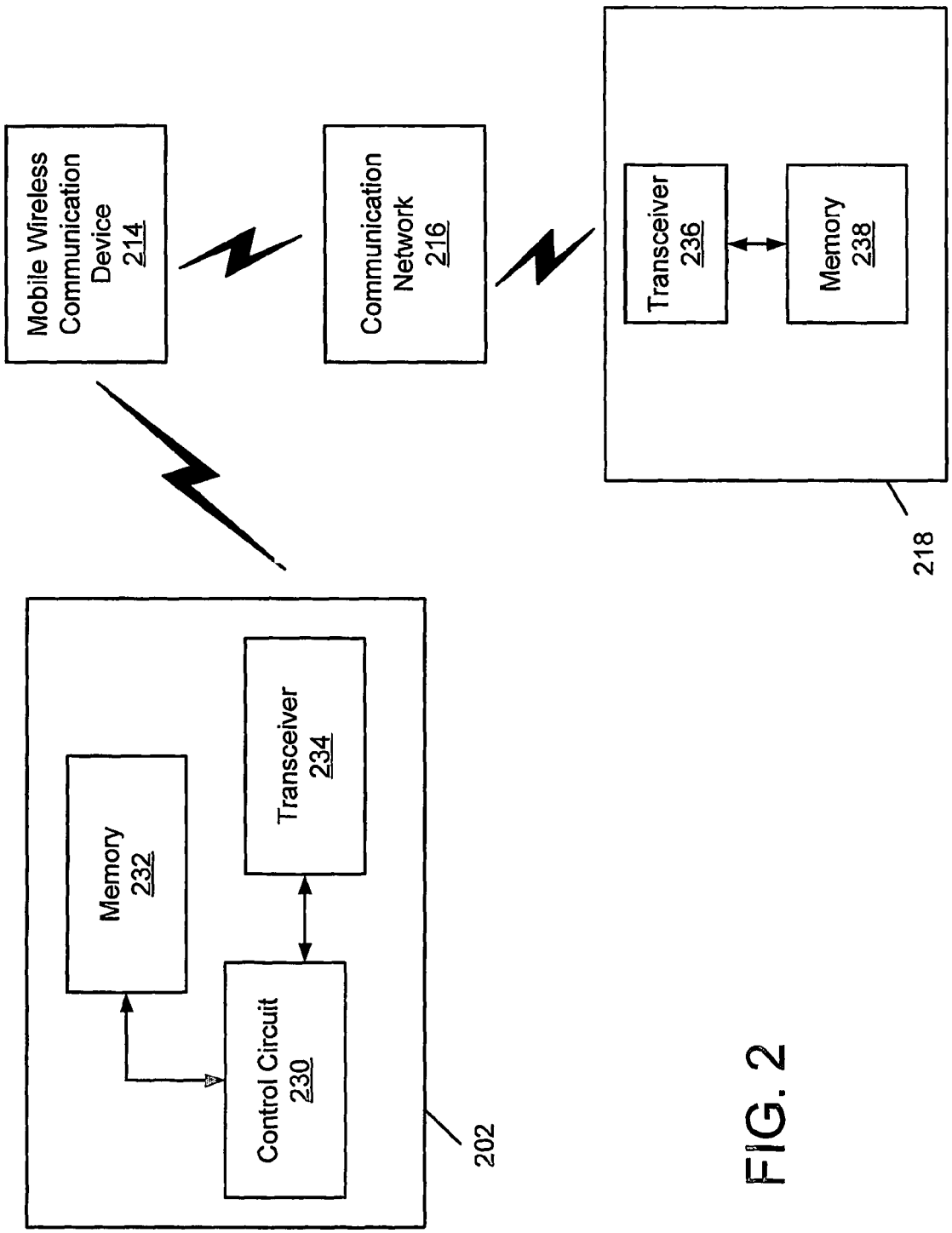
FIG. 2 is a schematic block diagram of a control module and a remote server of the system shown in FIG. 1 in accordance with an embodiment.

FIG. 2 is a schematic block diagram of a control module and a remote server of the system in FIG. 1 in accordance with an embodiment. Control module 202 includes an RF transceiver 234 for transmitting and receiving signals from a wireless phone 214. A control circuit 230 is coupled to the transceiver 234 and a memory 232. Control circuit 230 may include various types of control circuitry, digital and/or analog, and may include a microprocessor, microcontroller, application-specific integrated circuit (ASIC), programmable logic, and/or other circuitry configured to perform various input/output, control, analysis, and other functions described herein.

Memory 232 includes a database of known setting information for performance characteristics of specific wireless mobile phones (or other mobile wireless communication devices), wireless service providers, carriers, communication networks, TSP's, etc. Before integration into the vehicle, memory 232 of control module 202 may be programmed with known performance characteristic information for a predetermined set of phones, services, service providers, carriers, etc. FIG. 4 illustrates an exemplary table of setting information for various types of phones, services and carriers. Table 400 includes a plurality of performance characteristics such as noise cancellation 404, handsfree profile revisions 406, regions 408 for a plurality of manufacturers and/or models (e.g., Mfg/Model B 410), carriers (e.g., carrier 412), services (e.g., server B 414). Performance characteristics related to other devices, systems, providers, etc. may also be stored in memory 232. Alternatively, a table may be used that has different setting categories used to group various phones, services, etc. Each category would have associated settings for various performance characteristics. For example, a phone may be grouped into "category x" that has a certain level of audio settings (e.g., noise cancellation, echo cancellation, etc.). Control module 202 may access the information in memory 232 to "tune" or configure the wireless communication system in the vehicle to the settings associated with, for example, the particular type of wireless mobile phone used by the vehicle occupant. The process of accessing and updating memory 232 is discussed in detail below with respect to FIGS. 3A and 3B.

Referring to FIG. 2, a remote server 218 includes a transceiver 236 for transmitting and receiving data to/from mobile wireless communication device 214, e.g., a wireless mobile phone. Remote server 218 and wireless mobile phone 214 may communicate via a communication network 216. Remote server 218 also includes a memory 238. Memory 238 includes a database of known setting information for performance characteristics of specific wireless mobile phones (or other mobile wireless communication devices), wireless service providers, carriers, communication networks, TSP's, etc. The database of memory 238 may be updated with new performance characteristic settings for existing phones, service providers, carriers, communication networks, TSP's, etc. or with performance characteristics settings for new types of wireless phones (or other wireless devices), service providers, carriers, communication networks, TSP's, etc. Preferably, memory 238 of remote server 218 includes setting information for all known types of wireless phones, services, carriers, communication networks, etc. that may be used in conjunction with control module 202. As mentioned above, control module 202 may communicate with remote server 218 in order to obtain, for example, current settings information for a particular wireless mobile phone. The process of accessing and retrieving data from memory 238 of remote server 218 is discussed in detail below with respect to FIGS. 3A and 3B.

Figure 3A:
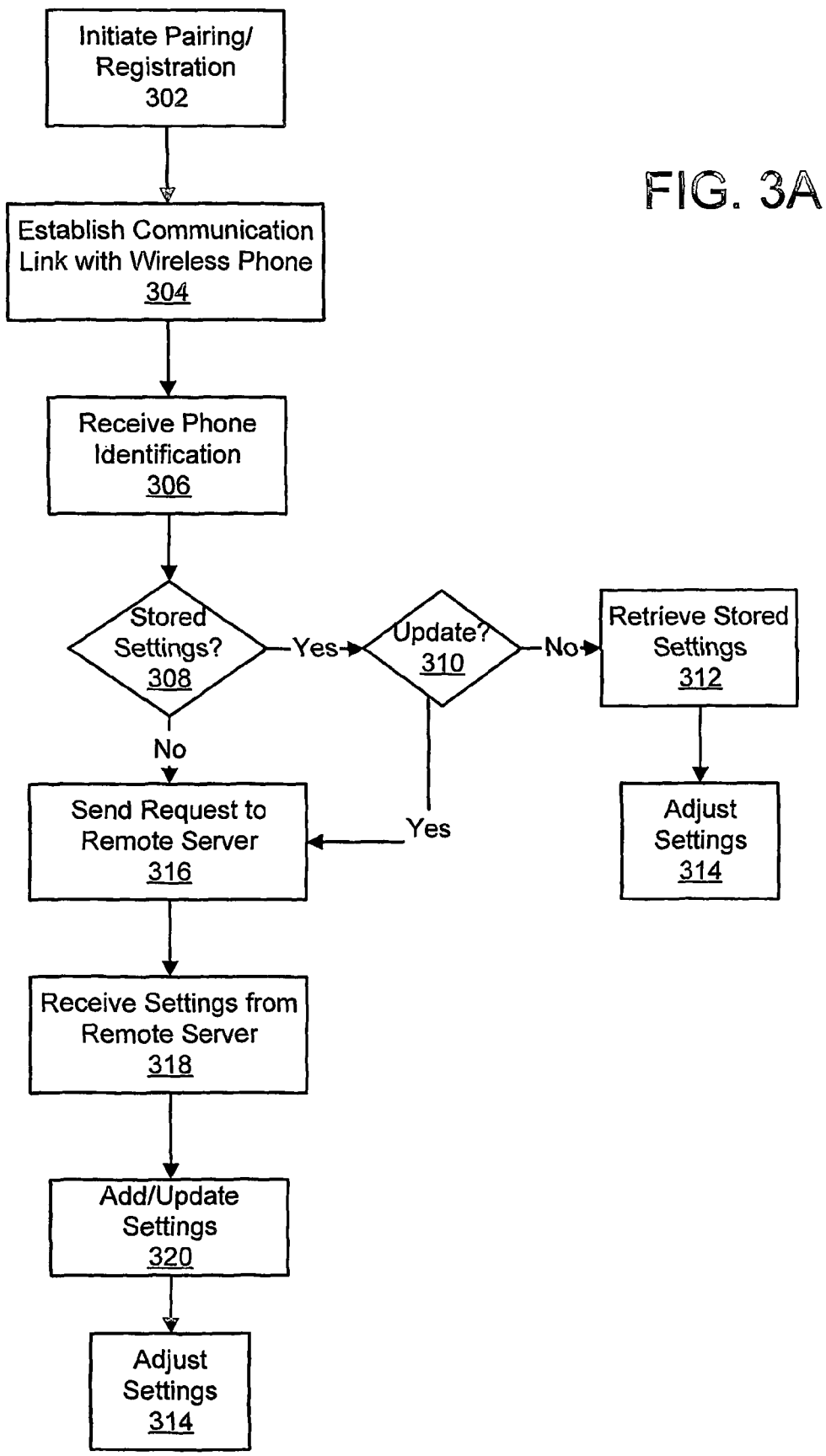
FIG. 3A illustrates a method of configuring a wireless communication system in a vehicle for operation with a mobile wireless communication device in accordance with an embodiment.

FIG. 3A illustrates a method of configuring a wireless communication system in a vehicle for operation with a wireless communication device in accordance with an embodiment. As discussed above, a communication link may be established between a control module 102 of vehicle 100 and wireless mobile phone 114 of an occupant of the vehicle. A communication link may be established with different wireless phones as different occupants use the communication system. Typically, control module 102 needs to be trained to recognize a particular wireless phone as a valid device. Accordingly, a registration or "pairing" process is used to train the control module so it may subsequently detect and recognize a particular wireless mobile phone (or other wireless device). An identifier or code for the wireless mobile phone (or other wireless device) may be provided to and stored by the control module during the pairing/registration process. For example, if the control module and wireless mobile phone are Bluetooth enabled, a unique Bluetooth identifier or code for the wireless phone may be provided to and stored by the control module during the pairing process. Pairing or registration is typically required only once for each wireless mobile phone (or other wireless device) to be used in connection with the control module.

A vehicle occupant, or user, initiates a pairing/registration process at block 302 for a, for example, new wireless mobile phone to be used with the vehicle wireless communication system. The pairing process may be initiated by, for example, actuation of a push button of a user interface, or by a verbal command spoken into a microphone of a vehicle audio system. At block 304, a wireless communication link is established between the control module and the wireless phone in accordance with a wireless communication standard, for example, the Bluetooth communication standard, 802.11, CDMA, etc. Once the communication link has been established, the wireless mobile phone may provide an identifier to the control module at block 306. The control module may use the wireless phone identifier to determine the type of wireless phone, e.g., make, model, manufacturer, etc. Control module then determines whether its memory 232 includes setting data for performance characteristics of the particular wireless mobile phone at block 308. In addition, the control module may search for setting information for a wireless service provider or carrier associated with the wireless phone, the communication network, TSP, etc. As discussed above, FIG. 4 illustrates an exemplary table of stored setting information for a plurality of performance characteristics. If the database of the control module memory does include setting information of, for example, the wireless mobile phone being paired to the system, it is then determined whether an update of the setting information is required at block 310. If no update is required, e.g., there have been no changes to the performance characteristic settings or an upgrade to software, the stored settings are retrieved by the control module from memory 232 at block 312. The setting information is then used to adjust the settings of the control module and other elements of the wireless communication system in the vehicle at block 314. For example, for a particular make/model of wireless mobile phone, the control module may reduce the level of audio amplification to compensate for an above average level of phone amplification.

If there is no previously stored setting information of, for example, the wireless mobile phone in the memory of the control module or if an update is required, the control module generates and sends a request to a remote server 218 at block 316. The request may be made, for example, by a call via the wireless phone or via a wireless phone transceiver mounted in the vehicle. Based on the request, the remote server retrieves setting information for the wireless mobile phone (and/or a wireless service, a carrier, communication network, etc.) from its memory and transmits the data to the control module via the wireless mobile phone. The setting data from the remote server may be received by the control module from the wireless mobile phone at block 318 using a data communication method such as DTMF (tones) or other means such as digital data/digital transmission. Alternatively, the setting information for the wireless mobile phone, communication network, etc. may be determined using a series of audio tones sent between the control module and the remote server. The control module may analyze the series of audio tones to determine the settings for the characteristics of the wireless phone or communication network. Alternatively, the control module may send a series of audio tones to the remote server which analyzes the audio tones to identify any problems. If problems are identified, the remote server may transmit data to the control module to perform repairs.

If there was no previously stored setting information for the wireless mobile phone (or service provider, communication network, etc.) in the control module memory, at block 320 a new entry is added to the memory database for the wireless mobile phone and its associated setting data. If there is an existing entry in the database in the control module memory for the wireless mobile phone, the entry is updated with the current setting information at block 320. Once the setting data has been received, the control module adjusts its settings accordingly for optimum performance of the wireless communication system. For example, for a particular carrier/service provider, the control module may increase the level of noise cancellation because the carrier does not provide noise cancellation in its network, may make changes to the level of echo cancellation, or may instruct the system to use a headset profile instead of the hands free profile.

Figure 3B:
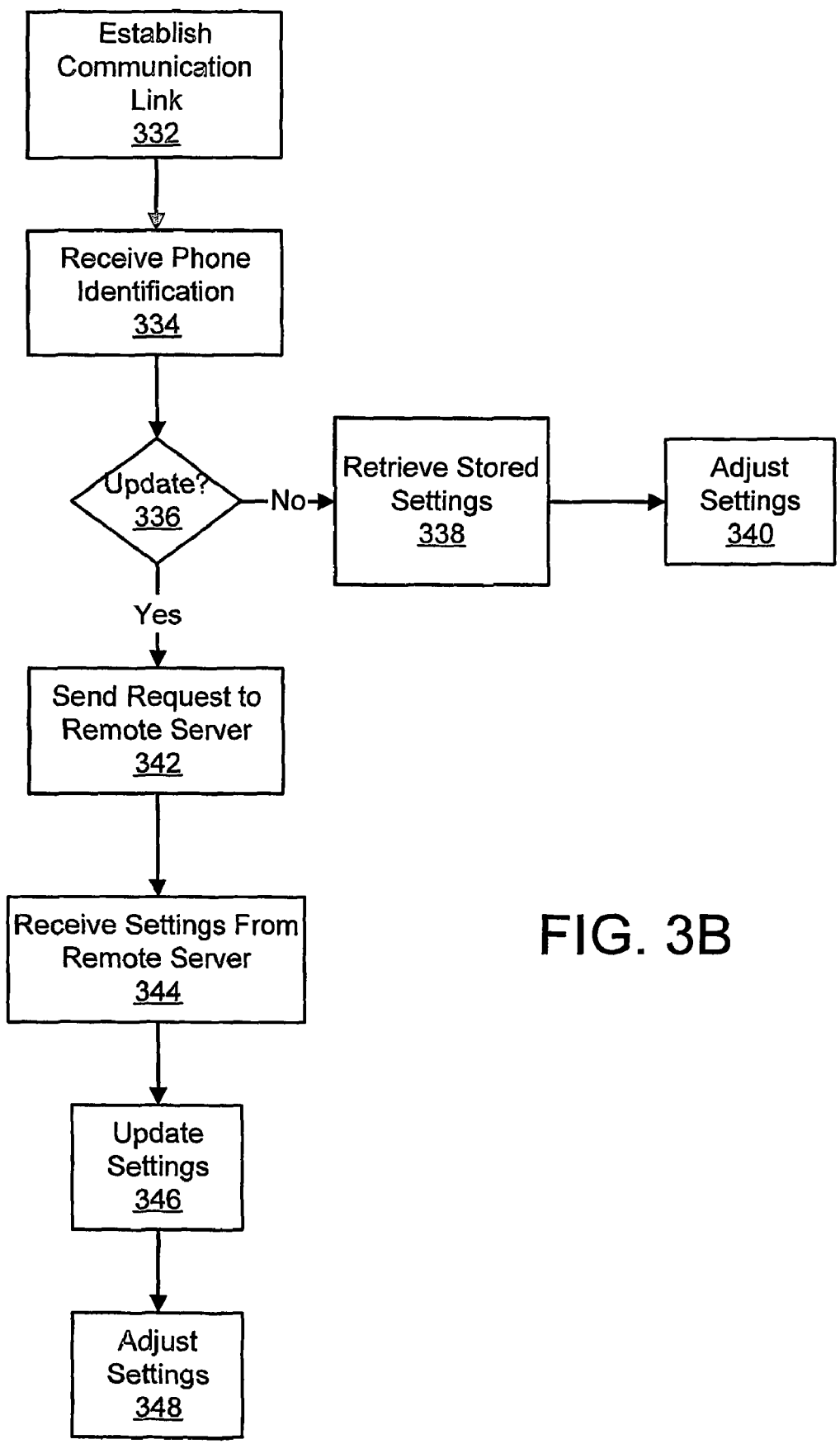
FIG. 3B illustrates a method for adjusting performance characteristics of a wireless communication system in a vehicle in accordance with an embodiment.

Once a wireless mobile phone (or other wireless communication device) has been paired/registered to the control module, it is possible that improvements or upgrades may be made over time to the wireless mobile phone, the communication network, services, etc., e.g., upgrades to software related to the communication standard or synchronization or other functions of the wireless mobile phone, communication network, services, etc. FIG. 3B illustrates a method for adjusting performance characteristics of a wireless communication system in a vehicle in accordance with an embodiment. Since the wireless mobile phone (or other wireless device) has already been paired/registered to the system, a pairing process is not required. When a vehicle occupant wishes to use the wireless mobile phone with the vehicle wireless communication system, a communication link is established between the control module and the wireless phone at block 332. The communication link may be established, for example, in response to a command received from the user via a user interface or audible signal Alternatively, a wireless connection may be established automatically when the wireless mobile phone is within a predetermined distance of the control module. At block 334, the wireless phone provides an identifier to the control module. The control module may use the identifier to access setting information stored in its memory that is associated with the wireless mobile phone. At block 336, the control module determines whether an update of the setting information is required. If an update is not required, the stored settings are retrieved at block 338 and used to adjust the setting of the system at block 340.

If an update of the setting information is required, the control module generates and sends a request to a remote, off-board server at block 342. The request may be made, for example, by a call via the wireless mobile phone. Based on the request, the remote server retrieves setting information for the wireless mobile phone (and/or a wireless service, a carrier, communication network, etc.) from its memory and transmits the data to the control module via the wireless mobile phone. The setting data from the remote server may be received by the control module from the wireless phone at block 344 using a data communication method such as DTMF (tones) or other means such as digital data/digital transmission. Alternatively, the new setting information may be determined by using a series of audio tones sent between the control module and the remote server. The control module may analyze the series of audio tones to determine the settings of the wireless phone and/or communication network. Alternatively, the control module may send a series of audio tones to the remote server which analyzes the audio tones to identify any problems. If problems are identified, the remote server may transmit data to the control module to perform repairs.

Once the setting data has been received by the control module, the entry in the database for the particular wireless mobile phone (and/or carrier, service provider, etc.) is updated with the current setting information at block 346. At block 348, the control module uses the updated setting information to adjust and configure the settings of the wireless communication system accordingly. For example, for a particular carrier/service provider, the control module may increase the level of noise cancellation because the carrier does not provide noise cancellation in its network or may make changes to the level of echo cancellation.

It is also important to note that the construction and arrangement of the elements of the control module and vehicle wireless communication system as shown in the preferred embodiments and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of various elements, values of parameters, mounting arrangements, materials, orientations, etc.) without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A control module for a wireless communication system in a vehicle, the wireless communication system having a plurality of operational settings relating to a mobile wireless communication device configured to communicate with a remote source to retrieve setting information, the control module comprising:
   a memory configured to store the setting information, wherein the setting information includes at least one of the audio cancellation, echo cancellation, and noise cancellation parameters;
   a control circuit coupled to the memory, wherein the control circuit is configured to adjust at least one of the plurality of operational settings of the wireless communication system based on the setting information stored in the memory; and
   a radio frequency transceiver coupled to the control circuit, the radio frequency transceiver configured to communicate with the mobile wireless communication device via a wireless communications link,
   wherein the control circuit is configured to determine whether the memory includes setting information for the mobile wireless communication device in communication with the radio frequency transceiver, and, in response to a determination that the memory does not include setting information for the mobile wireless communication device, using the radio frequency transceiver to send a request to the remote source via the wireless communications link, the request configured to cause the remote source to transmit the setting information to the radio frequency transceiver via the mobile wireless communication device and the wireless communications link, wherein the radio frequency transceiver is configured to receive the setting information for storage in the memory, and wherein the remote source is a remote server located outside of the vehicle.

2. A control module according to claim 1, wherein the radio frequency transceiver is configured to communicate with the mobile wireless communication device in accordance with a Bluetooth communication standard.

3. A control module according to claim 1, wherein the radio frequency transceiver is configured to receive an identifier from the mobile wireless communication device that is used by the control circuit to identify the setting information.

4. A control module according to claim 1, wherein the control circuit is configured to retrieve the setting information from the memory.

5. A control module according to claim 1, wherein the control circuit is configured to store the setting information in the memory upon receipt by the radio frequency transceiver.

6. A control module according to claim 1, wherein the control module is configured for integration into an interior element of the vehicle.

7. A control module according to claim 1, wherein the setting information is associated with at least one of a wireless service provider, a communication network and a carrier.

8. A control module according to claim 1, wherein the mobile wireless communication device is a wireless mobile phone.

9. A system for configuring a wireless communication system in a vehicle for use with a mobile wireless communication device using setting information for the mobile wireless communication device received from a remote source to adjust at least one of a plurality of operational settings of the wireless communication system in the vehicle, the system comprising:
   a control module in data communication with the remote source via the mobile wireless communication device, wherein the remote source is a remote server located outside of the vehicle;
   a memory local to the control module;
   wherein the control module configured to generate a request to retrieve the setting information and receive the setting information from the remote source via the mobile wireless communication device in response to a determination that the memory does not include setting information for the mobile wireless communication device, wherein the setting information relates to at least one performance characteristic for the mobile wireless communication device and includes at least one of the audio cancellation, echo cancellation, and noise cancellation parameters, wherein the control module is further configured to adjust at least one of the plurality of operational settings of the wireless communication system based on the setting information received from the mobile wireless communication device.

10. A system according to claim 9, wherein the mobile wireless communication device is a wireless mobile phone.

11. A system according to claim 9, wherein the mobile wireless communication device is configured to communicate with the remote source via a wireless communication link.

12. A system according to claim 9, wherein the mobile wireless communication device is configured to communicate with the control module via a wireless communication link.

13. A system according to claim 9, wherein the memory is configured to store setting information associated with a plurality of mobile wireless communication devices.

14. A system according to claim 9, wherein the setting information is associated with at least one of a wireless service provide, a communication network and a wireless carrier.

15. A method for configuring a wireless communication system in a vehicle for operation with a mobile wireless communication device using setting information for the mobile wireless communication device, the wireless communication system including a control module and having a plurality of operational settings, the method comprising:
  establishing a wireless communication link between the control module and the mobile wireless communication device;
  receiving an identifier for the mobile wireless communication device via the wireless communication link;
  generating a request at the control module for retrieving the setting information from the remote source, wherein the setting information includes at least one of the audio cancellation, echo cancellation, and noise cancellation parameters, and wherein the remote source is a remote server located outside of the vehicle;
  determining whether a memory local to the control module includes setting information for the mobile wireless communication device in communication with the radio frequency transceiver;
  in response to a determination that the memory does not include setting information for the mobile wireless communication device, sending the request from the control module to the mobile wireless communication device via the wireless communication link, the request causing the mobile wireless communication device to transmit the request to the remote source, the request transmitted to the remote source to cause the remote source to forward the setting information to the mobile wireless communication device;
  receiving the setting information via the wireless communication link at the control module; and
  configuring at least one of the plurality of operational settings of the wireless communications system based on the setting information received at the control module.

16. A method according to claim 15, wherein the wireless communications link is established in response to the initiation of a pairing sequence.

17. A method according to claim 15, wherein the wireless communications link is established in response to user actuation of an input device.

18. A method according to claim 15, wherein the wireless communications link is operated in accordance with a Bluetooth communications standard.

19. A method according to claim 15, wherein the wireless communications link is established when the mobile wireless communication device comes into proximity of the control module.

20. A method for configuring a wireless communication system in a vehicle for operation with a mobile wireless communication device using setting information for the mobile wireless communication device, the wireless communication system including a control module and having a plurality of operational settings, the method comprising:
  establishing a wireless communications link between the control module and the mobile wireless communication device using a radio frequency transceiver;
  receiving an identifier from the mobile wireless communication device via the wireless communications link;
  using the identifier to determine whether a local memory includes setting information for the mobile wireless communication device in communication with the radio frequency transceiver, wherein the setting information includes at least one of the audio cancellation, echo cancellation, and noise cancellation parameters;
  generating a request to retrieve the setting information in response to a determination that the local memory does not include setting information for the mobile wireless communication device;
  sending the request to a remote source via the wireless communication link and the mobile wireless communication device, wherein the remote source is a remote server located outside of the vehicle;
  receiving the setting information from the remote source via the mobile wireless communication device; and
  configuring at least one of the plurality of operational settings of the wireless communication system based on the setting information of the mobile wireless communication device.

21. A method according to claim 20, wherein the mobile wireless communication device is a wireless mobile phone.

22. A method according to claim 20, wherein the wireless communication system is a hands free telephone system.

* * * * *